US012750311B2

(12) United States Patent
Ardica et al.

(10) Patent No.: US 12,750,311 B2
(45) Date of Patent: Sep. 29, 2026

(54) ENHANCING INTERIOR GATEWAY PROTOCOL FUNCTIONALITIES FOR LOCAL AND REMOTE PEERING WITH VIRTUAL PRIVATE NETWORK BASED FABRIC

(71) Applicant: Cisco Technology, Inc., San Jose, CA (US)

(72) Inventors: Massimiliano Ardica, Valbonne (FR); Lukas Krattiger, Pleasanton, CA (US); Peter Psenak, Bratislava (SK); Lester C. Ginsberg, Mount Hermon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 99 days.

(21) Appl. No.: 18/956,360

(22) Filed: Nov. 22, 2024

(65) Prior Publication Data

US 2026/0149658 A1 May 28, 2026

(51) Int. Cl.
*H04L 45/42* (2022.01)
*H04L 12/46* (2006.01)
*H04L 45/12* (2022.01)

(52) U.S. Cl.
CPC .......... *H04L 45/42* (2013.01); *H04L 12/4641* (2013.01); *H04L 45/123* (2013.01)

(58) Field of Classification Search
CPC ....... H04L 45/123; H04L 45/34; H04L 45/36; H04L 45/38; H04L 45/40; H04L 45/42; H04L 45/44; H04L 45/46; H04L 45/48
See application file for complete search history.

(56) References Cited

U.S. PATENT DOCUMENTS 10,469,360 B1 11/2019 Bhat et al.
11,496,391 B1 * 11/2022 Przygienda ............ H04L 45/42
(Continued)

FOREIGN PATENT DOCUMENTS

WO 2017118880 7/2017

OTHER PUBLICATIONS

Shen N., et al., "IS-IS Routing with Reverse Metric", Internet Engineering Task Force (IETF), Request for Comments: 8500, Category: Standards Track, Feb. 2019, pp. 1-15.
(Continued)

*Primary Examiner* — Kostas J Katsikis
(74) *Attorney, Agent, or Firm* — Edell, Shapiro & Finnan, LLC

(57) ABSTRACT

Methods are provided for ensuring that a service node selects a local leaf node to reach remote destinations by leveraging reverse metric to inform the active service node of the topology of the leaf nodes. The methods involve obtaining connection information about a service node. The connection information indicates whether the service node is locally connected or connected via a virtual private network (VPN) tunnel. The methods further involve generating a reverse metric signaling based on the connection information. The reverse metric signaling includes a different metric value for the service node when the service node is locally connected than when the service node is connected via the VPN tunnel. The methods further involve providing the reverse metric signaling to the service node to cause the service node to select an intermediate network device from among a plurality of intermediate network devices to forward data traffic to a destination.

20 Claims, 6 Drawing Sheets

(56) References Cited

U.S. PATENT DOCUMENTS

| | | | | |
|---|---|---|---|---|
| 11,716,277 | B2 | 8/2023 | Mohanty et al. | |
| 12,015,544 | B1 | 6/2024 | Lo et al. | |
| 2007/0217419 | A1* | 9/2007 | Vasseur | H04L 45/24 370/392 |
| 2015/0063363 | A1* | 3/2015 | van Bemmel | H04L 61/2532 370/401 |
| 2015/0334667 | A1 | 11/2015 | Mo et al. | |
| 2015/0350059 | A1 | 12/2015 | Chunduri et al. | |
| 2016/0191374 | A1 | 6/2016 | Singh et al. | |
| 2016/0261487 | A1 | 9/2016 | Singh et al. | |
| 2018/0131610 | A1 | 5/2018 | Dong et al. | |
| 2020/0287780 | A1 | 9/2020 | Singh et al. | |
| 2022/0103425 | A1 | 3/2022 | Lo et al. | |

OTHER PUBLICATIONS

Talaulikar K., et al., "RFC 9339 OSPF Reverse Metric", Internet Engineering Task Force (IETF), RFC 9339, Standards Track, Dec. 2022, 8 Pages.

Sajassi, A., et al., "Integrated Routing and Bridging in Ethernet VPN (EVPN)," RFC 9135, Standards Track, ISSN: 2070-1721, Published Oct. 2021, 30 pages.

Cisco, "Cisco Nexus 9000 VXLAN BGP EVPN Data Center Fabrics," Fundamental Design and Implementation Guide, https://www.cisco.com/c/en/us/td/docs/dcn/whitepapers/cisco-vxlan-bgp-evpn-design-and-implementation-guide.html, Updated Dec. 9, 2024, 58 pages.

* cited by examiner

500

ENHANCING INTERIOR GATEWAY PROTOCOL FUNCTIONALITIES FOR LOCAL AND REMOTE PEERING WITH VIRTUAL PRIVATE NETWORK BASED FABRIC

TECHNICAL FIELD

The present disclosure generally relates to communication networks.

BACKGROUND

Enterprises deploy service devices inside data centers for performing various functions. Typically, an enterprise connects physical and/or virtual service node devices to an Ethernet Virtual Private Network (EVPN)-based fabric. The service nodes may involve firewalls, load-balancers, routers, switches, etc. Service nodes are often deployed as active/standby clusters with the cluster nodes connected to different leaf nodes to improve the overall resiliency of enterprise services. Different leaf nodes may be deployed in different data center rooms of the same building or in different data center buildings that are part of the same campus. Service nodes attach to different leaf nodes using virtual tunnels regardless of their physical locations. Leaf nodes may be part of geographically separate data center sites. As such, a resilient infrastructure that protects enterprise services against disruptions is formed.

This resilient infrastructure, however, is susceptible to suboptimal traffic forwarding. For example, a service node may forward data traffic to a remote leaf node via a virtual tunnel despite having a directly connected and properly functioning local leaf node. In other words, the creation of an adjacency between an active service node and a remote leaf node may cause suboptimal traffic forwarding or routing inefficiency by using a remote leaf node instead of using the local leaf node. There is no mechanism heretofore known that would allow a service node to differentiate between a local leaf node and a remote leaf node when making its forwarding decisions.

DETAILED DESCRIPTION

Overview

Figure 1:
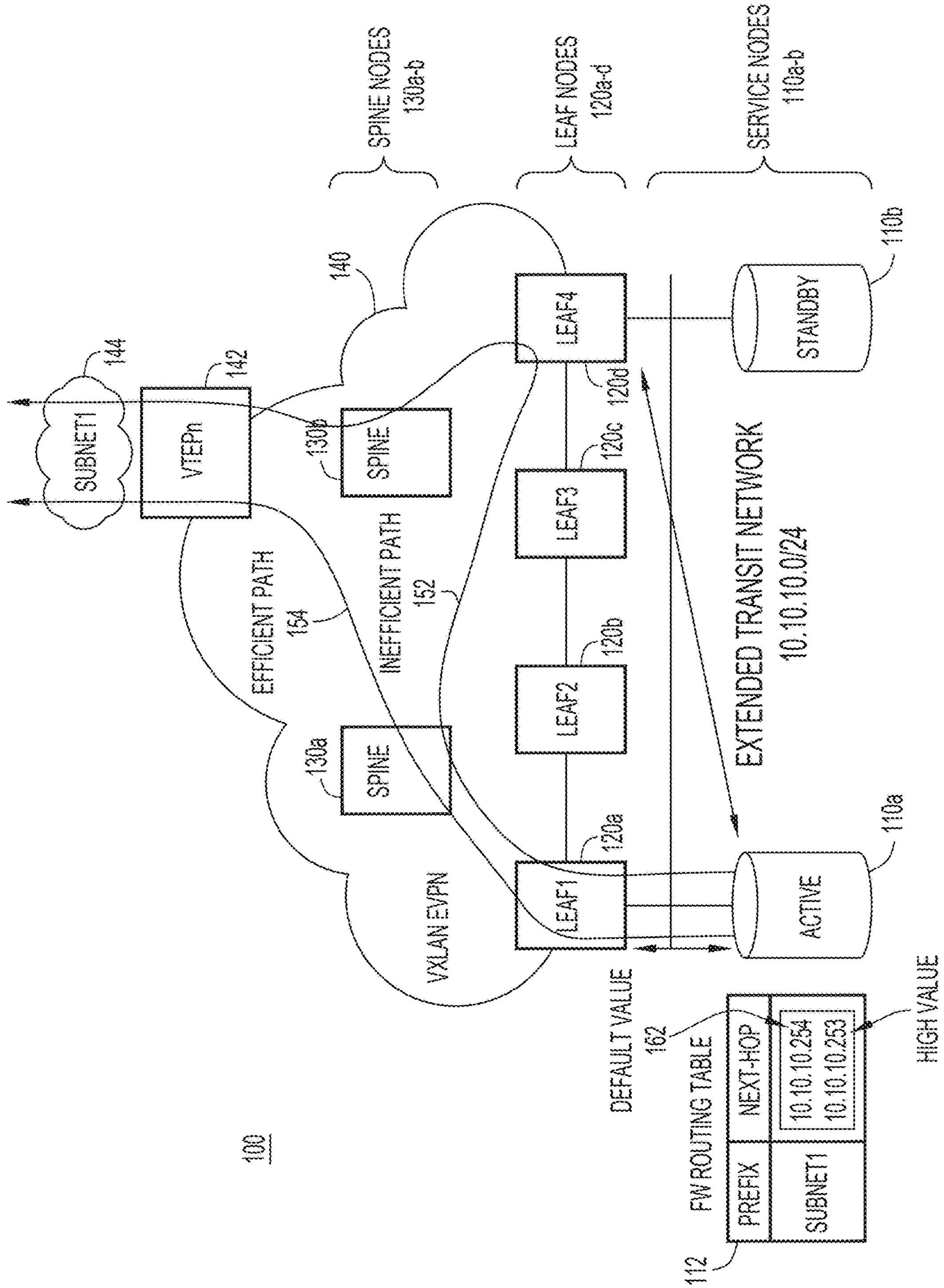
FIG. 1 is a diagram illustrating an environment in which an active service node is configured to select a local leaf node to forward data traffic, according to an example embodiment.

Techniques presented herein provide for an active service node device to select a local leaf node to reach remote destinations by leveraging reverse metric signaling to inform the active service node device of the topology of the leaf nodes.

In one form, a computer-implemented method is provided that involves obtaining connection information about a service node. The connection information indicates whether the service node is locally connected or connected via a virtual private network (VPN) tunnel. The computer-implemented method further includes generating a reverse metric signaling based on the connection information. The reverse metric signaling includes a different metric value for the service node when the service node is locally connected than when the service node is connected via the VPN tunnel. The method further includes providing the reverse metric signaling to the service node to cause the service node to select an intermediate network device from among a plurality of intermediate network devices to forward data traffic to a destination.

Example Embodiments

Network virtualization is used to create logically isolated networks in a data center network. For example, Virtual Extensible Local Area Network (VXLAN) technology is network virtualization technology that allows multiple enterprises (multiple tenants) to share a physical network without compromising security by segmenting the physical network into multiple virtual networks. Additionally, Ethernet Virtual Private Network (EVPN) enables flexible deployment of Ethernet traffic within a wide area network (WAN) and a data center. Routing protocols (e.g., Border Gateway Protocol "BGP") are typically used to exchange routing information between different autonomous systems and the Interior Gateway Protocol (IGP) manages internal routing information within an autonomous system. By combining these technologies, a data center infrastructure is designed in which network devices are divided into two tiers: spine nodes and leaf nodes.

Network devices are intermediate devices that forward data traffic from endpoint nodes or service nodes to a destination and data traffic from the destination to the service nodes. Network devices may be switches, routers, etc. As an example, a leaf node or an intermediate network device is connected to a server, i.e., an endpoint service node device, and a spine node is connected to the leaf node to form a mesh structure. This infrastructure may provide a high degree of scalability and flexibility to support large-scale data center networks. Intermediate network devices may use the Interior Gateway Protocol (IGP) to exchange information about Internet Protocol (IP) routes within an autonomous system (network segment) to manage internal routing information within the autonomous system.

To provide resiliency, service nodes are deployed in active and standby clusters with cluster nodes being connected to different leaf nodes. Leveraging Layer 2 extension capabilities of a VXLAN EVPN fabric ensures that the service nodes function as if they were connected to a common logical Layer 2 segment called an "Extended Transit Network".

This logical extension is provisioned by establishing a VXLAN tunnel between the leaf nodes. This allows carrying Layer 2 flows between active and standby service nodes. In other words, the use of VXLAN encapsulation allows establishing the same connectivity that would be achieved using physical connections in a traditional Ethernet deployment.

Service nodes may attach in different ways. In one or more example embodiments, dynamic routing protocols are deployed to form their attachments e.g., Internet Gateway Protocols (IGPs). When using a Layer 3 routing protocol, e.g., the IGP, between the service nodes and the fabric to exchange reachability information (routing information), the active service node device may be the only cluster node running the routing protocol and establishing routing adjacencies with the fabric. A logical extension of the Extended Transit Network across the fabric may allow the active service node device to establish Layer 3 adjacencies with both the local leaf node and the remote leaf node. The remote leaf node may be at a location where the standby service node device is physically connected. In other words, the remote leaf node may be locally connected to a standby service node cluster at a geographically remote enterprise site.

In one or more example embodiments, an active service node establishes Layer 3 adjacencies with both the local leaf node and the remote leaf node. The creation of local and remote routing adjacencies provides redundancies to minimize traffic outages during a service node failover event. As such, when a failover event occurs, the standby service node becomes the active service node. Specifically, the standby service node detects that the active service node has failed, so the standby service node takes over the active role. In so doing, the newly activated service node inherits the media access control (MAC) and IP addresses that were owned by the previously active service node. The newly activated service node leverages information in its routing table that was synchronized from the previously active node and continues to forward data traffic toward the fabric.

At the same time, the newly activated service node establishes IGP adjacencies with the leaf node (since, as previously mentioned, the standby node does not run any routing protocol). When doing so, the service node uses procedures similar to those used during graceful restart to minimize the churn of its forwarding plane during its transition to the active role. The leaf nodes receive the message from the service node, and this allows them to keep their adjacency established and therefore be able to continue forwarding data traffic towards the service node. Once the service node has re-established the adjacencies, it receives routing updates from the leaf nodes (if any are available) and updates its routing information that was kept frozen until this point with the information received from the previously active service node. The creation of this IGP adjacency between the active service node and the remote leaf node, while allowing to optimize traffic convergence during a service node failover event, may cause suboptimal traffic forwarding or routing inefficiency by using a remote leaf node that is connected via a VPN tunnel to forward traffic instead of using the local leaf node connected via a logical port channel (directly connected).

The techniques presented herein avoid this routing inefficiency. The techniques presented herein ensure optimal traffic path utilization between the active service node and any remote destination (internal or external to the fabric) in conjunction with the IGP. The techniques presented herein allow an external device to concurrently peer with multiple leaf nodes and, when doing so, ensure that the directly connected leaf node is used to optimally route the traffic towards the fabric.

FIG. 1 is a diagram illustrating an environment 100 in which an active service node is configured to select a local leaf node to forward data traffic, according to an example embodiment. The environment 100 includes service nodes 110*a-b*, such as an active service node 110*a* and a standby service node 110*b*, which use a forwarding and routing table 112 to forward data traffic to one of the leaf nodes 120*a-d* such as a first leaf node 120*a*, a second leaf node 120*b*, a third leaf node 120*c*, and a fourth leaf node 120*d*. In the environment 100, the active service node 110*a* establishes routing adjacencies with the first leaf node 120*a* and the fourth leaf node 120*d*. The data traffic may then be forwarded to spine nodes 130*a-b*, such as a first spine node 130*a* and a second spine node 130*b*. Data traffic enters and leaves the fabric (VXLAN EVPN 140) via a VXLAN tunnel endpoint (VTEP) 142 providing connectivity to an external subnet 144.

The notations 1, 2, 3, . . . . n; a, b, c, . . . n; “a-b”, “a-d”, “a-n”, and the like illustrate that the number of elements can vary depending on a particular implementation and is not limited to the number of elements being depicted or described. Moreover, this is only an example of various components, and the number and types of components, functions, etc. may vary based on a particular deployment and use case scenario.

Service nodes 110*a-b* are endpoint devices configured to execute applications and/or perform services of an enterprise. For example, a service node may be a physical server housed in a rack unit or a “rack” that performs specific function(s) for the enterprise, e.g., a computational task. The rack may house multiple service node devices. In the environment 100, the active service node 110*a* is housed separately from the standby service node 110*b*, e.g., at different geographic locations. Each service node may include a processor, a memory, and a network interface. A service node may be an apparatus or any programmable electronic or computing device capable of executing computer readable program instructions. The service nodes 110*a-b* may include internal and external hardware components such as those depicted and described below in connection with FIG. 6. In one or more example embodiments, a service node may be a virtual machine, a software container, a virtual device, a firewall, etc.

The network interface may include one or more network interface cards (having one or more ports) that enable components of the service node to send and receive packets or data over network(s) such as a local area network (LAN), a wide area network (WAN), and/or wireless access networks. The network interface may connect the service node to an enterprise network via a network device (e.g., one of the leaf nodes 120*a-d*).

The service nodes 110*a-b* use routing information to forward data traffic to one of the leaf nodes 120*a-d*. For example, routing information may be the forwarding and routing table 112. The active service node 110*a* is an active node that performs processing of data for the enterprise. The active service node 110*a* uses the forwarding and routing table 112 (fw routing table) to find the next hop for the data traffic (e.g., one of the leaf nodes 120*a-d*).

The forwarding and routing table 112 includes information about the external subnet 144 such as a first subnet prefix (“Subnet 1” 10.10.10.0/24), VLAN ID (not shown), MAC address (not shown), and a next hop, which indicates an Internet Protocol (IP) address of the next hop routing device to which the active service node 110*a* is to send traffic to the external subnet 144. The forwarding and routing table 112 may further include the state of the route and assigned metric value(s). For example, the forwarding and routing table 112 includes the IP address for the next hop as 10.10.10.254 (.254) for the first leaf node 120*a* and 10.10.10.253 (.253) for the fourth leaf node 120*d*. Based on the forwarding and routing table 112, the active service node 110*a* (the active node) is attached to the first leaf node 120*a* and to the fourth leaf node 120*d*. The active service node 110*a* establishes routing adjacencies with these two leaf nodes and can use these leaf nodes to forward data traffic.

Leaf nodes 120*a-d* are responsible for managing communications (e.g., routing and forwarding) originating from and destined for physical servers (and virtual machines and virtual switches hosted by the physical servers) in the rack, i.e., the service nodes 110*a-b*. Leaf nodes 120*a-d* may provide redundancy and fault-tolerance for communications associated with the service nodes 110*a-b*. Leaf nodes 120*a-d* are peer nodes, i.e., peer intermediate peer network devices. For example, the first leaf node 120*a* and the fourth leaf node 120*d* are peer intermediate network devices that provide communications with respect to the active service node 110*a*.

Leaf nodes 120*a-d* are further configured to communicate with a network controller (not shown), which manages communications between them. A leaf node may be an apparatus or any programmable electronic or computing device capable of executing computer readable program instructions. The leaf nodes 120*a-d* may include internal and external hardware components such as those depicted and described in FIG. 6. The leaf nodes 120*a-d* forward data traffic to and from spine nodes 130*a-b* and the service nodes 110*a-b*.

Spine nodes 130*a-b* connect to a gateway device, such as the VTEP 142, to forward data traffic out of the VXLAN EVPN 140 or the external subnet 144 and receive data traffic from the VTEP 142. The spine nodes 130*a-b* may be switches and/or routers that forward data traffic in the VXLAN-based IP fabric. A spine node may be an apparatus or any programmable electronic or computing device capable of executing computer readable program instructions. The spine nodes 130*a-b* may include internal and external hardware components such as those depicted and described in FIG. 6.

The VTEP 142 is a gateway or a node that encapsulates and decapsulates network traffic, i.e., Ethernet frames to and from VXLAN packets. The VTEP 142 may be a physical device, such as a router or a switch or a virtual device. The VTEP 142 may be an apparatus or any programmable electronic or computing device capable of executing computer readable program instructions. The VTEP 142 may include internal and external hardware components such as those depicted and described in FIG. 6.

As noted above, the Interior Gateway Protocol (IGP) is used to manage internal routing information within the VXLAN EVPN 140 (i.e., the virtual private network). For example, the service nodes 110*a-b* and the leaf nodes 120*a-d* may use IGP to exchange routing information. The leaf nodes 120*a-d* perform IGP exchanges with anycast gateway switch virtual interface (SVI) and an External Layer 3 Device. In the environment 100, the first leaf node 120*a* and the fourth leaf node 120*d* perform IGP exchanges with anycast gateway SVI and the External Layer 3 Device. In the environment 100, the active service node 110*a* learns a remote destination (Subnet1 in the forwarding and routing table 112) via both IGP peers (the first leaf node 120*a* and the fourth leaf node 120*d*). The active service node 110*a* then makes an equal-cost-multi-path (ECMP) decision to determine what next-hop to use.

For example, in related art, depending on the hashing decision taken on a per-flow basis, only about 50% of traffic follows an efficient path 154 and approximately the other 50% of the traffic follows an inefficient path 152. This not only represents a suboptimal traffic path, but, depending on the specific switch's capabilities, may cause traffic black-holing because certain leaf nodes (switch platforms) may not have the capability of de-capsulating the VXLAN traffic, performing a Layer 3 lookup, and re-encapsulating the traffic toward the remote destination.

The techniques presented herein aim to solve the suboptimal traffic forwarding issues between the service node and a remote destination reachable via the fabric, leveraging the "reverse metric" functionality available with an open shortest path first (OSPF) protocol and/or an intermediate system to intermediate system (IS-IS) protocol, for example. The techniques presented herein avoid using the inefficient path 152 and instead forward traffic (nearly 100%) using the efficient path 154. That is, the techniques presented herein aim to ensure that traffic uses the efficient path 154 between the active service node (the active service node 110*a*) and any remote destination (internal or external to the fabric) in conjunction with the IGP.

The techniques presented herein allow an external device to concurrently peer with multiple leaf nodes (intermediate network devices) and, when doing so, ensure that the directly connected leaf node (the first leaf node 120*a*) is used to optimally route the traffic toward the fabric via the efficient path 154 instead of the inefficient path 152. In one or more example embodiments, a local leaf node that is connected via a logical port-channel is prioritized for use over a remote leaf node that is connected via a virtual private network (VPN) tunnel.

The techniques presented herein leverage the "reverse metric" functionality (e.g., available with OSPF and IS-IS protocols) and deploy endpoint learning functionality offered by VXLAN EVPN fabrics (local versus remote end-point recognition). While the use of "reverse metric" with OSPF and IS-IS may be contemplated in the standard described in Internet Engineering Task Force (IETF) Request for Comments (RFC) 9339 and RFC 8500, the techniques presented herein involve binding together the reverse metric functionality and a topology recognition mechanism to distinguish endpoint information learned locally or via a VXLAN EVPN tunnel.

In the techniques presented herein, the IGP process modifies the "reverse metric" value depending on this learned topological information. For example, in the forwarding and routing table 112, the IP address of the fourth leaf node 120*d* is assigned or set to a higher value than a default value with respect to the active service node 110*a* (a high value 160) and the IP address of the first leaf node 120*a* is assigned or set to a default value 162 (i.e., a lower value that indicates a closer adjacency). As such, the active service node 110*a* uses the efficient path 154 to forward traffic within and outside the VXLAN EVPN 140 and avoids the inefficient path 152 (which now has a higher metric value than the default value 162). While typically active service nodes use intermediate network devices that have the lowest metric value, this is just an example. A reverse metric value being set may depend on a use case scenario and a specific network deployment. In one example embodiment, the local leaf node may set a higher metric value than the default metric value and the remote leaf node may set the default metric value.

In one or more example embodiments, the reverse metric signaling includes a tuple of Type, Length, and Value (TLV) where the TLV for a remote leaf node is set differently from the local leaf node. The reverse metric value is generated to reflect the topological view of the leaf node with respect to the attached service node (typically the active service node).

The techniques presented herein combine "reverse metric" with endpoint learning capabilities of VXLAN EVPN fabrics to ensure that the active service node receives, via a directly connected leaf node (the logical port-channel), the best metric to reach remote destinations. That is, the active service node 110*a* prioritizes using a leaf node connected via physical interfaces (logical port-channel) instead of using a leaf node connected via a VPN tunnel.

While one or more example embodiments describe reverse metric capability with respect to OSPF and IS-IS, the disclosure is not limited thereto. Example embodiments apply to other protocols now known or later developed. Moreover, while example embodiments are described with reference to IGP, the disclosure is not limited thereto. Example embodiments apply to other protocols that may learn topology information and may be used to communicate the learned topology information to the service nodes i.e., to distinguish between locally connected intermediate network devices and remotely connected intermediate network devices.

Figure 2:
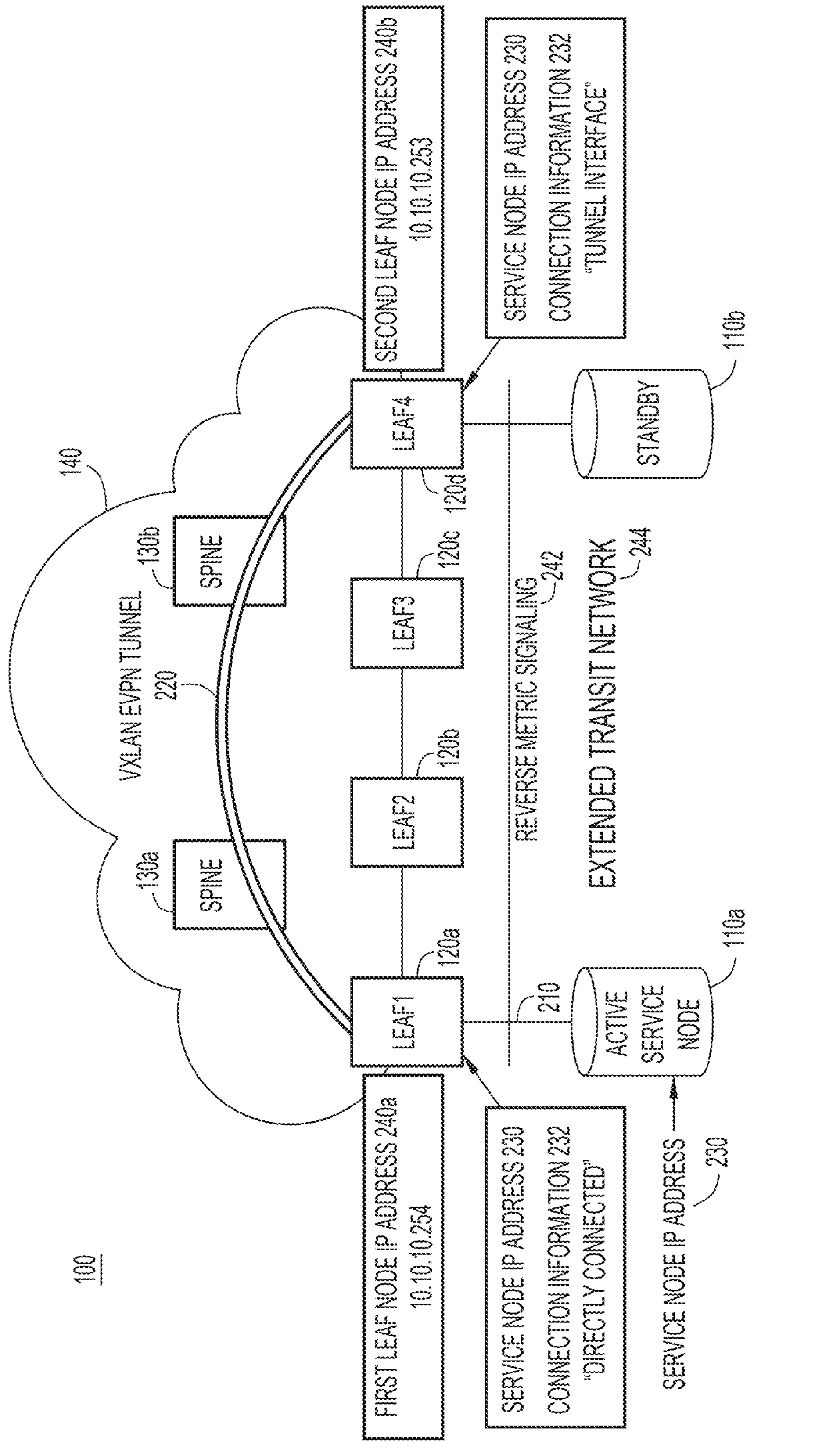
FIG. 2 is a diagram illustrating the environment of FIG. 1 in which each leaf node in a Virtual Extensible Local Access Network (VXLAN) EVPN-based fabric has a topological view for a location of an active service node, according to an example embodiment.

With continued reference to FIG. 1, FIG. 2 is a diagram illustrating the environment 100 in which each leaf node in the VXLAN EVPN fabric has a topological view for a location of an active service node 110*a*, according to an example embodiment.

In the environment 100, the active service node 110*a* is directly connected to the first leaf node 120*a* via a direct connection interface 210 (i.e., a logical port-channel) and is connected to the fourth leaf node 120*d* via a VXLAN EVPN tunnel 220 (i.e., a VPN tunnel). The active service node 110*a* has a service node IP address 230, the first leaf node 120*a* has a first leaf node IP address 240*a*, and the fourth leaf node 120*d* has a second leaf node IP address 240*b*. A reverse metric signaling 242 is generated based on connection information 232 and may be advertised on an extended transit network 244.

Each leaf node in the VXLAN EVPN 140 generates a topological view for the location of the active service node 110*a* (i.e., its location with respect to the active node). That is, each leaf node in the VXLAN EVPN 140 has a specific "view" for what concerns the location where the active service node 110*a* is connected. As an example, the first leaf node 120*a* and the fourth leaf node 120*d* learn the service node IP address 230, e.g., "10.10.10.1" from an address resolution protocol message, for example. However, the first leaf node 120*a* learns the service node IP address 230 via the direct connection interface 210 (the logical port-channel), whereas the fourth leaf node 120*d* learns the same information via the fabric's Multiprotocol BGP (MP-BGP) EVPN control plane (the VXLAN EVPN tunnel 220) and associates that information with a logical tunnel interface. In other words, the fourth leaf node 120*d* learns the service node IP address 230 from a remote peer leaf node (i.e., the first leaf node 120*a*) via a Multiprotocol Border Gateway Protocol (MP-BGP) EVPN, which is used to distribute IP and Media Access Control (MAC) addresses across the network.

The connection information 232 is determined at each leaf node. For example, the first leaf node 120*a* determines "directly connected" as the connection information 232 with respect to active service node 110*a*, and the fourth leaf node 120*d* determines "tunnel interface" as the connection information 232 with respect to active service node 110*a*. The connection information 232 at each leaf node is a "topological view" for each attached active service node. This "topological view" on each leaf node in the VXLAN EVPN 140 serves as a trigger to notify the IGP protocol to advertise different reverse metric information (the reverse metric signaling 242) via the established IGP adjacencies. For example, the active service node 110*a* has a first established IGP adjacency with the first leaf node 120*a* that has the first leaf node IP address 240*a* of "10.10.10.254" and a second established IGP adjacency with the fourth leaf node 120*d* that has the second leaf node IP address 240*b* of "10.10.10.253".

Each leaf node generates a reverse metric signaling 242 for the IGP adjacency. The reverse metric signaling 242 may be provided via the extended transit network 244. Depending on the learned topological view, the reverse metric signaling 242 has a different metric value depending on how it is connected to the active service node 110*a*. That is, the reverse metric value for the IGP adjacency from the local physical ports (the direct connection interface 210) is better than from the remote interface (the VXLAN EVPN tunnel 220). The advertised reverse metric value in the reverse metric signaling 242 may be associated with the IGP next-hop IP addresses defined on the extended transit network 244 for the leaf nodes, such as "10.10.10.254" as the first leaf node IP address 240*a* and "10.10.10.253" as the second leaf node IP address 240*b*.

In one example embodiment, a leaf node that is directly connected to a service node may maintain a default reverse metric value, whereas a remote leaf node may change the reverse metric value (e.g., increase to a higher metric value) associated with the next-hop information to make the remote leaf node less preferable. This is just one example in which service nodes select intermediate network devices that have the lowest metric values. The reverse metric values are generated or adjusted to reflect the "topological view" learned by the first leaf node 120*a* and the fourth leaf node 120*d* but how the value is adjusted (set higher or lower) may vary based on a particular deployment and use case scenario. The reverse metric signaling 242 may be part of an open shortest path first routing protocol or an intermediate system-to-intermediate system routing protocol.

The active service node 110*a* receives the reverse metric signaling 242 from various leaf nodes, e.g., the first leaf node 120*a* and the fourth leaf node 120*d*. Since the reverse metric values are now different, the remote prefixes advertised toward the active service node 110*a* by the first leaf node 120*a* and the fourth leaf node 120*d* are no longer considered ECMP paths, but the active service node 110*a* prefers instead the path via the directly connected leaf node, i.e., the first leaf node 120*a*, that has the lowest metric value.

Figure 3:
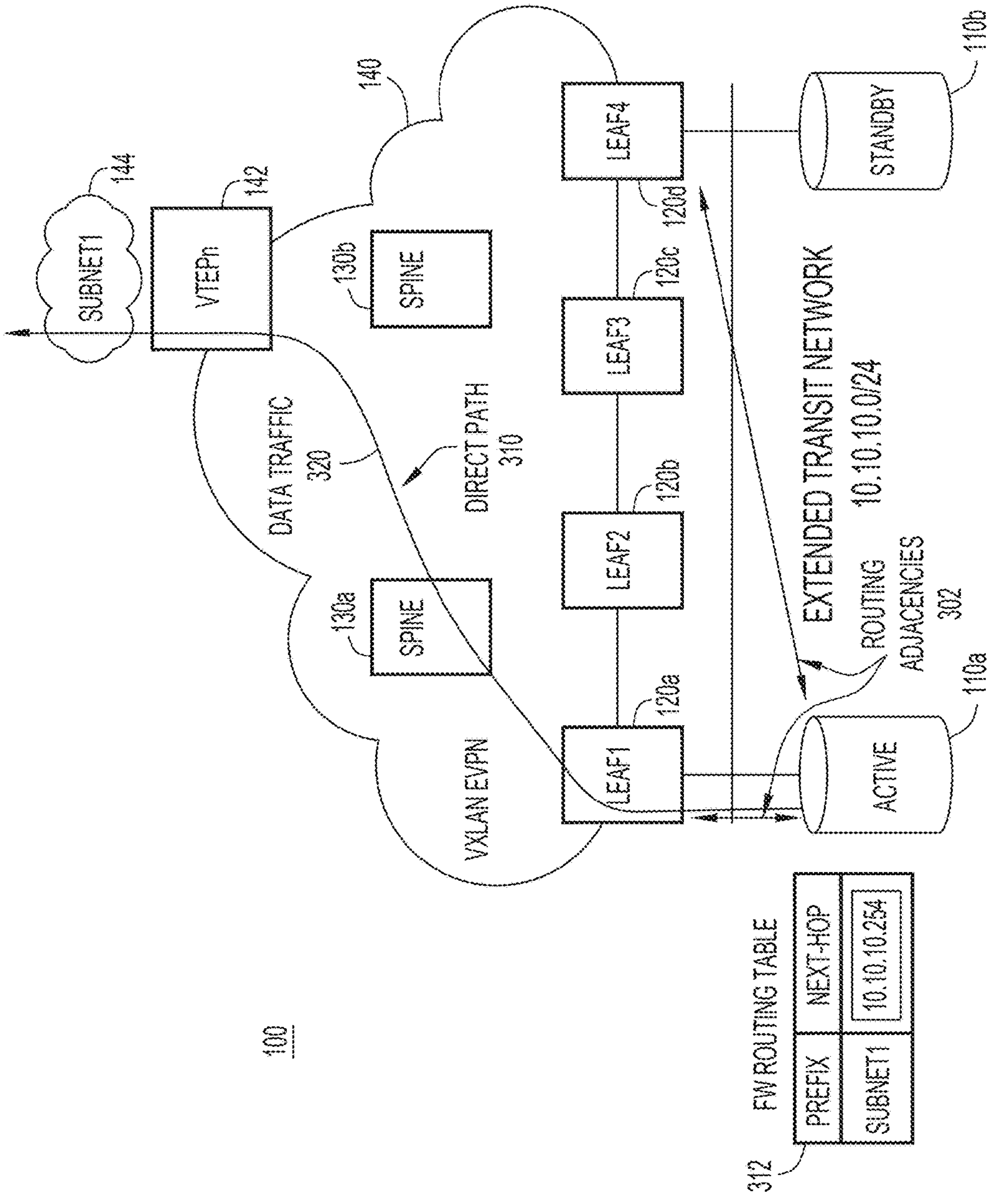
FIG. 3 is a diagram illustrating the environment of FIG. 1 in which the active service node forwards data traffic via a directly connected leaf node, according to an example embodiment.
Figure 4:
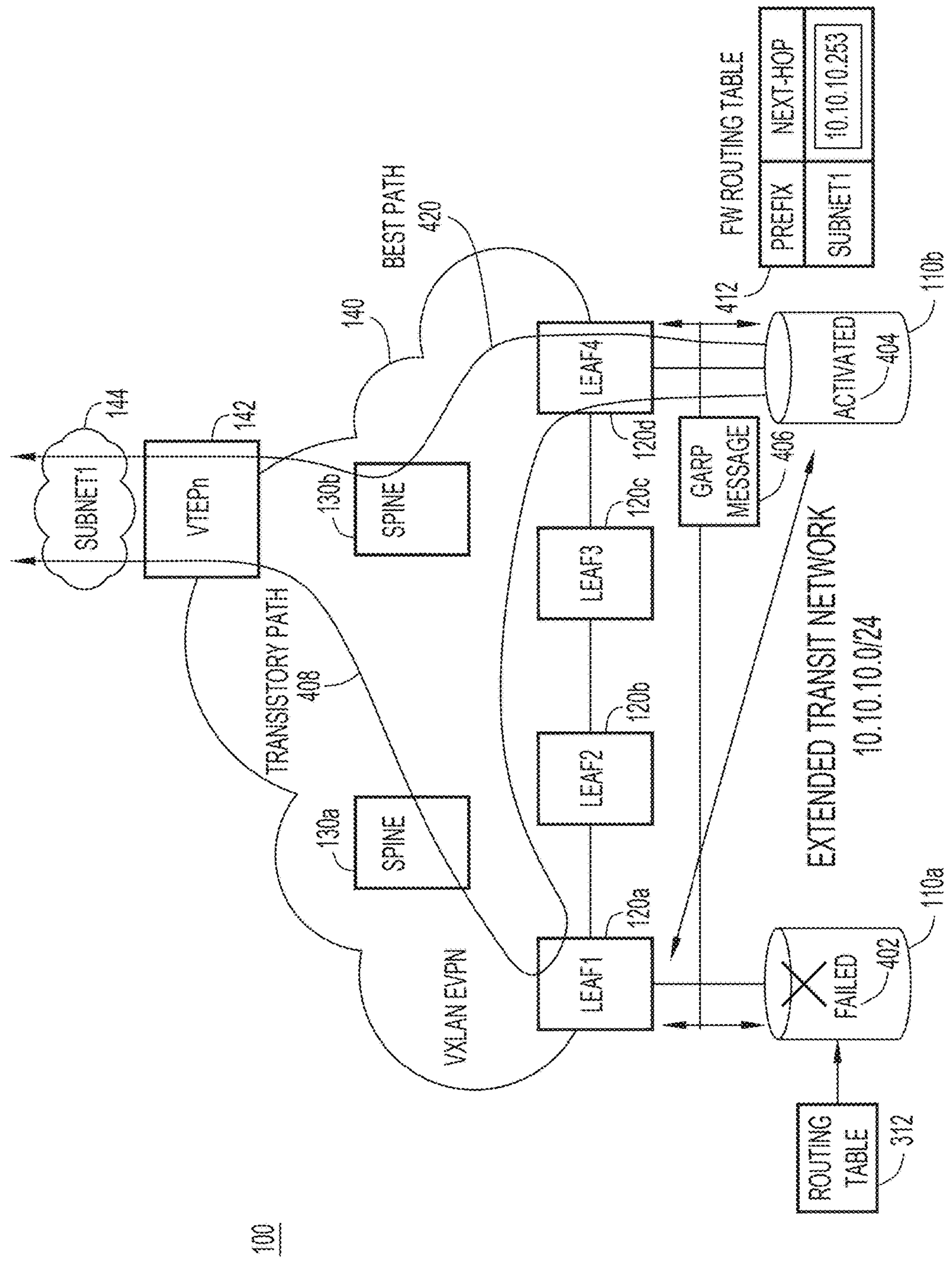
FIG. 4 is a diagram illustrating the environment of FIG. 1 in which a standby service node is activated, in response to a failure event in the active service node, and switches to using a direct path via its directly connected leaf node, according to an example embodiment.

With continued reference to FIGS. 1 and 2, FIG. 3 is a diagram illustrating the environment 100 in which the active service node 110*a* forwards data traffic via a directly connected leaf node, according to an example embodiment. In the environment 100, the active service node 110*a* has routing adjacencies 302 with the first leaf node 120*a* and the fourth leaf node 120*d* but based on the reverse metric signaling from each leaf node used to update a routing table 312, the active service node 110*a* uses a direct path 310 via a directly connected leaf node (i.e., the first leaf node 120*a*) to forward data traffic 320 to the VTEP 142.

Specifically, the active service node 110*a* receives a reverse metric signaling (not shown) from the first leaf node 120*a* and the fourth leaf node 120*d* (routing adjacencies 302). The reverse metric signaling may be part of or defined in the OSPF protocol or the IS-IS protocol such as a reverse metric TLV. The reverse metric signaling includes a reverse metric value indicative of the cost to reach its neighbor (a routing adjacency) over the path. The reverse metric value is a sum of costs of the individual links that make up the path. The reverse metric value is adaptively adjusted based on congestion at the routing adjacency. In one example embodiment, the reverse metric value is increased to make the congested path less preferable. That is, the lowest cost route (lowest reverse metric value) is most preferable. Additionally, the reverse metric value is increased based on connection information to make a remote leaf node less preferable than a local leaf node. As such, a first reverse metric value from the first leaf node 120*a* is different than a second reverse metric value from the fourth leaf node 120*d*.

Based on these reverse metric values, the routing table 312 of the active service node 110*a* is updated to only include an IP address of the first leaf node 120*a* as next-hop to reach the destination subnet1 prefix (i.e., the external subnet 144). In other words, the routing table 312 is updated to exclude (not use) the IP address of the fourth leaf node 120*d*. The remote prefixes advertised toward the active service node 110*a* by the first leaf node 120*a* and the fourth leaf node 120*d* are not considered ECMP paths, but the active service node 110*a* prefers the direct path 310 via the directly connected leaf node, i.e., the first leaf node 120*a*, instead of a path via the fourth leaf node 120*d* (via the VPN tunnel).

If the active service node 110*a* is experiencing a failure event, the routing table 312 would need to be adjusted, i.e., the situation should be reversed and the fourth leaf node 120*d* should become the preferred next hop for the newly activated service node, i.e., the fourth leaf node 120*d*.

With continued reference to FIGS. 1-3, FIG. 4 is a diagram illustrating the environment 100 of FIG. 1 in which a standby service node is activated, in response to a failure event in the active service node, and switches to using a direct path via its directly connected leaf node, according to an example embodiment.

Specifically, at 402, the active service node 110*a* locally connected to the first leaf node 120*a* via a direct interface fails (i.e., experiences a failure event such as a malfunction).

At 404, the standby service node 110*b* is activated. The standby service node 110*b* now becomes the active service node. The standby service node 110*b* is locally connected to the fourth leaf node 120*d* and is connected to the first leaf node 120*a* via a VPN tunnel. When the standby service node 110*b* becomes activated (in response to the failure event in the active service node 110*a*), the standby service node 110*b* inherits the routing table 312 of the active service node 110*a* and the IP address of the previously active service node i.e., the active service node 110*a*. As such, the standby service node 110*b* has the service node IP address of the active service node 110*a* e.g., the "10.10.10.1".

After inheriting the IP address of the active service node 110*a* and the routing table 312, the standby service node 110*b* generates a gratuitous address resolution protocol (GARP) message. Meanwhile, the standby service node 110*b* forwards data traffic toward the fabric based on the inherited routing information (the routing table 312) that was synced from the previously active service node (the active service node 110*a*). This means that the next hop used in this interim or transitory phase is the first leaf node 120*a* with the first IP address of 10.10.10.254 in the routing table 312. The data traffic is forwarded via a transitory path 408 from the standby service node 110*b* to the first leaf node 120*a* via the VPN tunnel with the peer network device (the fourth leaf node 120*d*). While the transitory path 408 (that uses the VPN tunnel) is a suboptimal traffic path, this is a transitory state. The suboptimal bouncing of data traffic via the transitory path 408 is temporary. However, the first leaf node 120*a* receiving the data traffic should be capable of de-capsulating data traffic (or traffic flows), performing a Layer 3 lookup and re-encapsulating data traffic toward a remote destination.

At 406, the standby service node 110*b* sends a gratuitous address resolution protocol (GARP) message. The address resolution protocol message may be triggered by an activation of the standby service node 110*b*. Sending these messages ensures that the service node's IP address (10.10.10.1) is now learned by fourth leaf node 120*d* as directly connected and by the first leaf node 120*a* as reachable via a remote leaf node (via a VPN tunnel).

Based on learning the new location information (an updated topological view) for the newly activated service node (i.e., the standby service node 110*b*), a reverse metric signaling is generated. Specifically, the first leaf node 120*a* now bumps up the reverse metric value associated with the next-hop IP address 10.10.10.254, whereas the fourth leaf node 120*d* now sets the reverse metric value to the default value (decreases it). That is, the new location information triggers the announcement of "reverse metric" information on the routing adjacencies i.e., the first leaf node 120*a* and the fourth leaf node 120*d*. In one example embodiment, the reverse metric information is signaled as part of the standard "hello" messages exchanged between directly connected peers.

In one example embodiment, a leaf node that has been elected as Designated Intermediate System (DIS) on the Extended Transit Network, receives and processes the "reverse metric" information and generates a new pseudo-node link state packet (LSP) update that is flooded in the Layer 2 segment. The standby service node 110*b* (that is now activated) processes the LSP update and updates the routing table with the IP address of the fourth leaf node 120*d* (10.10.10.253), i.e., the updated fw routing table 412. The LSP update triggers an update in the routing information that was inherited from the active service node 110*a* to generate the updated fw routing table 412. That is, the standby service node 110*b* programs a best path 420 via the directly connected leaf node (the fourth leaf node 120*d*) as soon as the standby service node 110*b* has re-established IGP adjacencies with the fabric. The standby service node 110*b* now uses the best path 420 instead of the transitory path 408.

The techniques presented herein aim to solve suboptimal traffic forwarding issues that use VPN tunnels (e.g., the inefficient path 152 of FIG. 1). The techniques presented herein apply ECMP or other hashing algorithms for routing data traffic equally only between similarly connected intermediate network devices, such as directly connected next-hop nodes (local leaf nodes). The ECMP is not applied when the next-hop nodes are connected differently (e.g., one is directly connected and another via VPN tunnels with remote leaf nodes).

To communicate the network topology information that distinguishes between remote and local leaf nodes, to the service nodes, the techniques presented herein leverage reverse metric functionality that is part of OSPF and/or IS-IS protocols. That is, the techniques provide endpoint learning in VXLAN EVPN fabrics (local vs remote end-point recognition) and then use "reverse metric" to convey the learned topology information to the service nodes. The techniques presented herein bind reverse metric with a topology recognition mechanism at the leaf nodes for efficient data traffic forwarding using directly connected leaf nodes and avoiding using remote leaf nodes, when possible.

The techniques presented herein address failure events in active service nodes by triggering endpoint learning updates and signaling the newly learned connection information to the newly activated service node (in the form of reverse metric values) to trigger routing updates. The techniques presented herein allow leaf nodes to determine whether the endpoint information was learned locally or via a VXLAN EVPN or VPN tunnel and thus, know, at any given point in time, the specific location where the active service node is connected. The IGP process modifies the reverse metric value depending on this learned topological information so that the active service node has data traffic only using optimal paths (and avoids VPN tunnels when possible).

To minimize the traffic outage during a service node's failover event, the active service node establishes connectivity redundantly to the leaf nodes where it is directly connected and to the remote leaf node where the standby service node is located. Additionally, suboptimal traffic forwarding between the service node and a remote destination reachable via the fabric is avoided by leveraging the "reverse metric" functionality (part of OSPF and IS-IS protocols) with the endpoint learning functionality.

Figure 5:
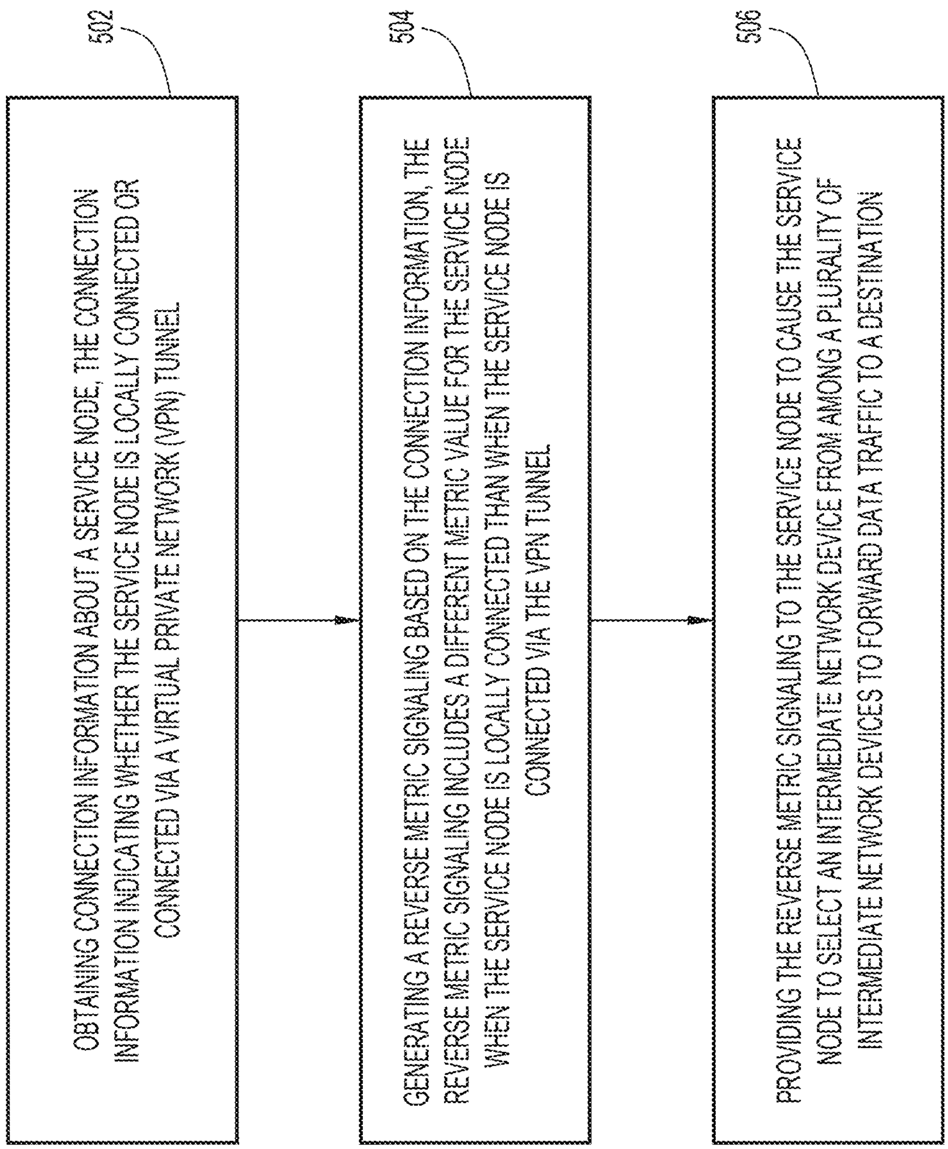
FIG. 5 is a flowchart illustrating a computer-implemented method of providing a reverse metric signaling to a service node to cause the service node to select a locally connected intermediate network device to forward data traffic to a destination, according to an example embodiment.

FIG. 5 is a flowchart illustrating a computer-implemented method 500 of providing a reverse metric signaling to a service node to cause the service node not to select a locally connected intermediate network device to forward data traffic to a destination, according to an example embodiment. The computer-implemented method 500 may be performed by one or more computing devices or an apparatus. For example, the computer-implemented method 500 may be performed by one of the leaf nodes 120*a-d*, such as the first leaf node 120*a* and/or the fourth leaf node 120*d* of FIGS. 1-4.

The computer-implemented method 500 involves at 502, obtaining connection information about a service node. The connection information indicates whether the service node is locally connected or connected via a virtual private network (VPN) tunnel.

The computer-implemented method 500 further involves at 504, generating a reverse metric signaling based on the connection information. The reverse metric signaling includes a different metric value for the service node when the service node is locally connected than when the service node is connected via the VPN tunnel.

The computer-implemented method 500 further involves at 506, providing the reverse metric signaling to the service node to cause the service node to select an intermediate network device from among a plurality of intermediate network devices to forward data traffic to a destination.

According to one or more example embodiments, the operation 502 of obtaining the connection information may include the intermediate network device receiving, from the service node, an address resolution protocol message that includes an Internet Protocol (IP) address of the service node and determining whether the address resolution protocol message is received via a logical port-channel of the intermediate network device or via the VPN tunnel that is a virtual extensible local access network tunnel established with a peer intermediate network device of the plurality of intermediate network devices, to form a topological view with respect to the service node.

In one form, in the computer-implemented method 500, determining that the address resolution protocol message is received via the virtual extensible local access network tunnel may be based on receiving the address resolution protocol message in a multiprotocol border gateway protocol control plane.

In another form, the operation 504 of generating the reverse metric signaling may involve setting a default metric value based on determining that the service node is connected via the logical port-channel and setting a higher metric value than the default metric value based on determining that the service node is connected via the VPN tunnel. The service node may select one or more intermediate devices of the plurality of intermediate network devices that have a lowest metric value, to forward the data traffic.

In one instance, the operation 504 of generating the reverse metric signaling may be in response to the operation 502 of obtaining the connection information.

According to one or more example embodiments, the reverse metric signaling may be part of an open shortest path first routing protocol or part of an intermediate system-to-intermediate system routing protocol.

In yet another form, the service node may be a standby node that becomes active in response to a failure event in an active service node. In response to becoming active, the standby node may obtain routing information from the active service node. Based on this routing information, the standby node (that is now active) may forward the data traffic via a peer intermediate network device of the plurality of intermediate network devices, which is directly connected to the active service node.

In one instance, the operation 506 of providing the reverse metric signaling to the service node may involve providing a reverse metric value in the reverse metric signaling. The reverse metric value may indicate that the intermediate network device is directly connected to the service node. The reverse metric value may trigger an update in the routing information of the service node to forward the data traffic via the intermediate network device instead of via the peer intermediate network device.

According to one or more example embodiments, the plurality of intermediate network devices may be leaf nodes in a switching fabric of a VPN and may be configured to forward the data traffic between the service node and one or more spine nodes of the switching fabric.

Figure 6:
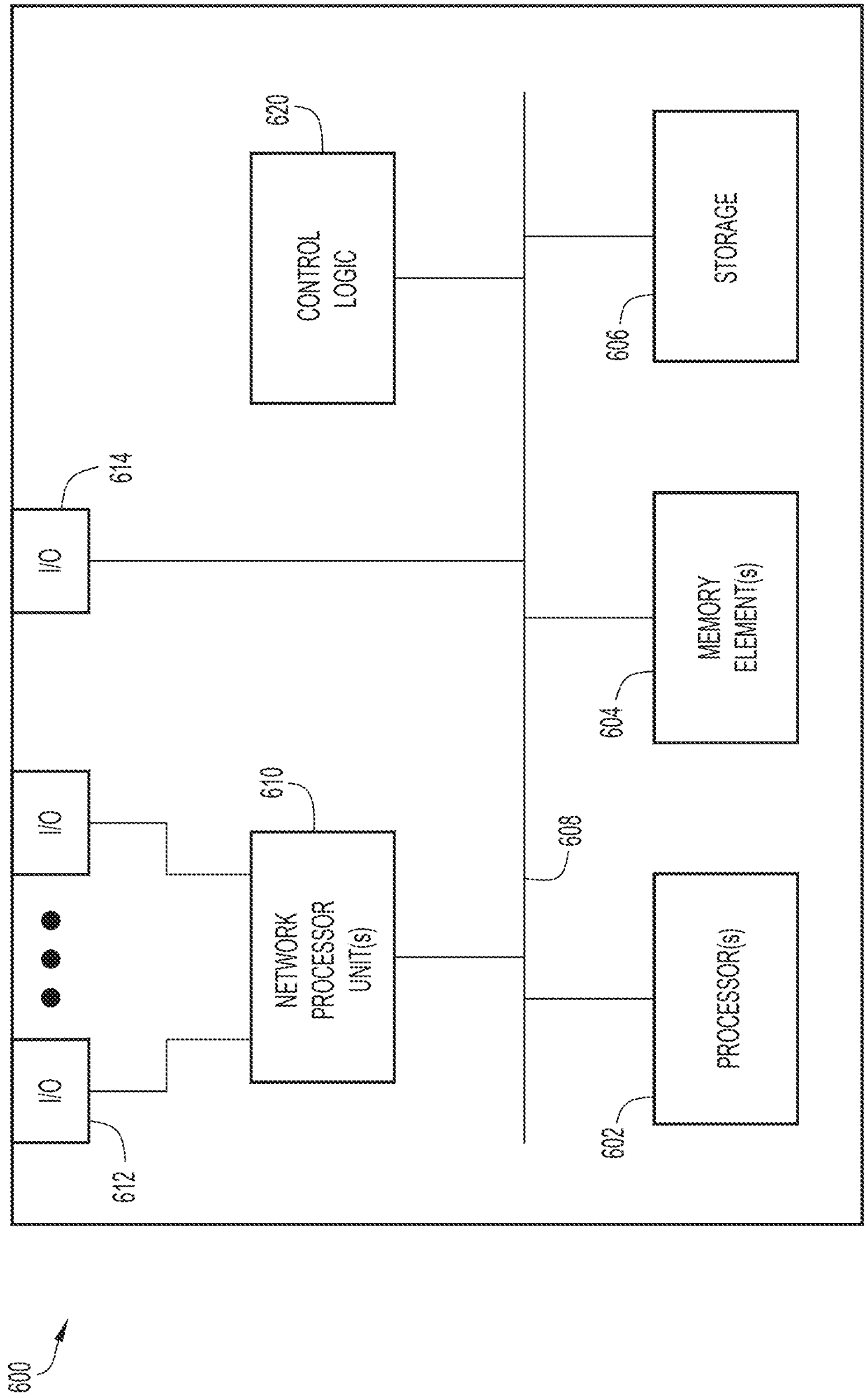
FIG. 6 is a hardware block diagram of a computing device that may perform functions associated with any combination of operations in connection with the techniques depicted and described in FIGS. 1-5, according to various example embodiments.

FIG. 6 is a hardware block diagram of a computing device 600 that may perform functions associated with any combination of operations in connection with the techniques depicted in FIGS. 1-5, according to various example embodiments, including, but not limited to, operations of one or more entities of FIGS. 1-4 such as one of the service nodes 110*a-b*, one of the leaf nodes 120*a-d*, one of the spine nodes 130*a-b*, or the VTEP 142. It should be appreciated that FIG. 6 provides only an illustration of one example embodiment and does not imply any limitations with regard to the environments in which different example embodiments may be implemented. Many modifications to the depicted environment may be made.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations, and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of the potential processing elements, microprocessors, digital signal processors, baseband signal processors, modems, PHY, controllers, systems, managers, logic, and/or machines described herein can be construed as being encompassed within the broad term 'processor'.

In at least one embodiment, one or more memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with one or more memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, e.g., in the case of a service node, external devices can be a mechanism to display data to a user, such as, for example, a monitor, a display, a touch screen, or the like.

In various example embodiments, control logic 620 can include instructions that, when executed, cause processor(s) 602 to perform operations, which can include, but not be limited to, providing overall control operations of the computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory and a network interface configured to enable network communications. The apparatus further includes a processor. In this apparatus, the processor is configured to perform a method, which includes obtaining connection information about a service node. The connection information indicates whether the service node is locally connected or connected via a virtual private network (VPN) tunnel. The method further involves generating a reverse metric signaling based on the connection information. The reverse metric signaling includes a different metric value for the service node when the service node is locally connected than when the service node is connected via the VPN tunnel. The method further includes providing the reverse metric signaling to the service node to cause the service node to select the apparatus from among a plurality of intermediate network devices to forward data traffic to a destination.

In yet another example embodiment, one or more non-transitory computer readable storage media encoded with instructions are provided. When the media is executed by a processor, the instructions cause the processor to execute a method that involves obtaining connection information about a service node. The connection information indicates whether the service node is locally connected or connected via a virtual private network (VPN) tunnel. The method further involves generating a reverse metric signaling based on the connection information. The reverse metric signaling includes a different metric value for the service node when the service node is locally connected than when the service node is connected via the VPN tunnel. The method further involves providing the reverse metric signaling to the service node to cause the service node to select an intermediate network device from among a plurality of intermediate network devices to forward data traffic to a destination.

In yet another example embodiment, a system is provided that includes the devices and operations explained above with reference to FIGS. 1-6.

The programs described herein (e.g., control logic 620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 606 and/or memory element(s) 604 can store data, software, code, instructions (e.g., processor instructions), logic, parameters, combinations thereof, and/or the like used for operations described herein. This includes the storage 606 and/or memory element(s) 604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., WiFi®/WiFi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used, such as electric, sound, light, infrared, and/or radio, to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms refer to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:

obtaining connection information about a service node, the connection information indicating whether the service node is locally connected or connected via a virtual private network (VPN) tunnel;

generating a reverse metric signaling based on the connection information, the reverse metric signaling including a different metric value for the service node when the service node is locally connected than when the service node is connected via the VPN tunnel; and providing the reverse metric signaling to the service node to cause the service node to select an intermediate network device from among a plurality of intermediate network devices to forward data traffic to a destination.

2. The method of claim 1, wherein obtaining the connection information includes:

receiving, by the intermediate network device from the service node, an address resolution protocol message that includes an Internet Protocol (IP) address of the service node; and determining, by the intermediate network device, whether the address resolution protocol message is received via a logical port-channel of the intermediate network device or via the VPN tunnel that is a virtual extensible local access network tunnel established with a peer intermediate network device of the plurality of intermediate network devices, to form a topological view with respect to the service node.

3. The method of claim 2, wherein determining that the address resolution protocol message is received via the virtual extensible local access network tunnel is based on receiving the address resolution protocol message in a multiprotocol border gateway protocol control plane.

4. The method of claim 2, wherein generating the reverse metric signaling includes:

setting a default metric value based on determining that the service node is connected via the logical port-channel; and setting a higher metric value than the default metric value based on determining that the service node is connected via the VPN tunnel, wherein the service node selects one or more intermediate devices of the plurality of intermediate network devices that have a lowest metric value, to forward the data traffic.

5. The method of claim 4, wherein generating the reverse metric signaling is in response to obtaining the connection information.

6. The method of claim 1, wherein the reverse metric signaling is part of an open shortest path first routing protocol or an intermediate system-to-intermediate system routing protocol.

7. The method of claim 1, wherein the service node is a standby node that becomes active in response to a failure event in an active service node and, in response to becoming active, obtains routing information from the active service node and, based on the routing information, forwards the data traffic via a peer intermediate network device of the plurality of intermediate network devices, which is directly connected to the active service node.

8. The method of claim 7, wherein providing the reverse metric signaling to the service node includes:

providing a reverse metric value in the reverse metric signaling, the reverse metric value indicating that the intermediate network device is directly connected to the service node, and the reverse metric value triggering an update in the routing information of the service node to forward the data traffic via the intermediate network device instead of via the peer intermediate network device.

9. The method of claim 1, wherein the plurality of intermediate network devices are leaf nodes in a switching fabric of a VPN and are configured to forward the data traffic between the service node and one or more spine nodes of the switching fabric.

10. An apparatus comprising:

a memory;

a network interface configured to enable network communications; and a processor, wherein the processor is configured to perform a method comprising:

obtaining connection information about a service node, the connection information indicating whether the service node is locally connected or connected via a virtual private network (VPN) tunnel;

generating a reverse metric signaling based on the connection information, the reverse metric signaling including a different metric value for the service node when the service node is locally connected than when the service node is connected via the VPN tunnel; and providing the reverse metric signaling to the service node to cause the service node to select the apparatus from among a plurality of intermediate network devices to forward data traffic to a destination.

11. The apparatus of claim 10, wherein the apparatus is an intermediate network device and the processor is configured to obtain the connection information by:

receiving, from the service node, an address resolution protocol message that includes an Internet Protocol (IP) address of the service node; and determining whether the address resolution protocol message is received via a logical port-channel or via the VPN tunnel that is a virtual extensible local access network tunnel established with a peer intermediate network device of the plurality of intermediate network devices, to form a topological view with respect to the service node.

12. The apparatus of claim 11, wherein the processor is configured to determine that the address resolution protocol message is received via the virtual extensible local access network tunnel based on receiving the address resolution protocol message in a multiprotocol border gateway protocol control plane.

13. The apparatus of claim 11, wherein the processor is configured to generate the reverse metric signaling by:

setting a default metric value based on determining that the service node is connected via the logical port-channel; and setting a higher metric value than the default metric value based on determining that the service node is connected via the VPN tunnel, wherein the service node selects one or more intermediate devices of the plurality of intermediate network devices that have a lowest metric value, to forward the data traffic.

14. The apparatus of claim 13, wherein the processor is configured to generate the reverse metric signaling in response to obtaining the connection information.

15. The apparatus of claim 10, wherein the reverse metric signaling is part of an open shortest path first routing protocol or an intermediate system-to-intermediate system routing protocol.

16. The apparatus of claim 10, wherein the service node is a standby node that becomes active in response to a failure event in an active service node and, in response to becoming active, obtains routing information from the active service node and, based on the routing information, forwards the data traffic via a peer intermediate network device of the plurality of intermediate network devices, which is directly connected to the active service node.

17. The apparatus of claim 16, wherein the processor is configured to provide the reverse metric signaling to the service node by:

providing a reverse metric value in the reverse metric signaling, the reverse metric value indicating that the apparatus is directly connected to the service node, and the reverse metric value triggering an update in the routing information of the service node to forward the data traffic via the network interface of the apparatus instead of via the peer intermediate network device.

18. One or more non-transitory computer readable storage media encoded with software comprising computer executable instructions that, when executed by a processor, cause the processor to perform a method including:

obtaining connection information about a service node, the connection information indicating whether the service node is locally connected or connected via a virtual private network (VPN) tunnel;

generating a reverse metric signaling based on the connection information, the reverse metric signaling including a different metric value for the service node when the service node is locally connected than when the service node is connected via the VPN tunnel; and providing the reverse metric signaling to the service node to cause the service node to select an intermediate network device from among a plurality of intermediate network devices to forward data traffic to a destination.

19. The one or more non-transitory computer readable storage media according to claim 18, wherein the computer executable instructions cause the processor to obtain the connection information by:

receiving, from the service node, an address resolution protocol message that includes an Internet Protocol (IP) address of the service node; and determining whether the address resolution protocol message is received via a logical port-channel of the intermediate network device or via the VPN tunnel that is a virtual extensible local access network tunnel established with a peer intermediate network device of the plurality of intermediate network devices, to form a topological view with respect to the service node.

20. The one or more non-transitory computer readable storage media according to claim 19, wherein the computer executable instructions cause the processor to determine that the address resolution protocol message is received via the virtual extensible local access network tunnel based on receiving the address resolution protocol message in a multiprotocol border gateway protocol control plane.

* * * * *